United States Patent
Yuh

(10) Patent No.: US 7,985,512 B2
(45) Date of Patent: Jul. 26, 2011

(54) BIPOLAR SEPARATOR PLATE FOR USE IN A FUEL CELL ASSEMBLY AND FOR PREVENTING POISONING OF REFORMING CATALYST

(75) Inventor: Chao-Yi Yuh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 208 days.

(21) Appl. No.: 12/016,564

(22) Filed: Jan. 18, 2008

(65) Prior Publication Data

US 2008/0113251 A1 May 15, 2008

Related U.S. Application Data

(62) Division of application No. 11/404,550, filed on Apr. 14, 2006, now abandoned.

(51) Int. Cl.
H01M 8/02 (2006.01)
(52) U.S. Cl. ......... 429/518; 429/468; 429/469; 429/129
(58) Field of Classification Search .............. 429/34–35, 429/129, 518, 468–469
See application file for complete search history.

(56) References Cited

U.S. PATENT DOCUMENTS

| | | | |
|---|---|---|---|
| 3,907,590 A | 9/1975 | Saunders | |
| 4,221,123 A | 9/1980 | Bucci et al. | |
| 4,659,379 A | 4/1987 | Singh et al. | |
| 4,714,586 A | 12/1987 | Swarr et al. | |
| 4,835,071 A | 5/1989 | Williams et al. | |
| 4,999,155 A | 3/1991 | Ong et al. | |
| 5,558,948 A | 9/1996 | Doyon | |
| 5,698,337 A | 12/1997 | Nitschkeet et al. | |
| 5,773,161 A * | 6/1998 | Farooque et al. ............. | 429/509 |
| 6,372,374 B1 | 4/2002 | Li et al. | |
| 6,379,833 B1 | 4/2002 | Hill et al. | |
| 6,663,999 B2 | 12/2003 | Van Berkel et al. | |
| 6,719,946 B2 | 4/2004 | Yuh et al. | |
| 2001/0012576 A1 | 8/2001 | Christiansen | |
| 2003/0072989 A1 | 4/2003 | Lee | |
| 2003/0118466 A1 | 6/2003 | Yuh et al. | |
| 2003/0165729 A1 | 9/2003 | Ringel | |
| 2003/0215691 A1 * | 11/2003 | Li et al. ............................ | 429/38 |
| 2004/0065717 A1 | 4/2004 | Saijo et al. | |
| 2004/0121222 A1 | 6/2004 | Sarkar et al. | |
| 2004/0185326 A1 | 9/2004 | Wetzel et al. | |
| 2005/0095483 A1 | 5/2005 | Song et al. | |
| 2005/0142426 A1 | 6/2005 | Danzer et al. | |
| 2006/0024547 A1 | 2/2006 | Waldbillig et al. | |
| 2006/0093887 A1 | 5/2006 | Nammensma et al. | |

FOREIGN PATENT DOCUMENTS

| | | |
|---|---|---|
| DE | 40 30 945 | 4/1994 |
| JP | 06-036781 | 2/1994 |
| JP | 09-082345 | 3/1997 |
| JP | 09-139218 | 5/1998 |
| JP | 10-208759 | 8/1998 |
| WO | 98/08262 | 2/1998 |

OTHER PUBLICATIONS

Supplementary European Search Report and Search Opinion issued in counterpart EPO Application No. 07717359.9-1227 on Jan. 11, 2010.

* cited by examiner

*Primary Examiner* — Patrick Joseph Ryan
*Assistant Examiner* — Ladan Mohaddes
(74) *Attorney, Agent, or Firm* — Cowan, Liebowitz & Latman, P.C.

(57) ABSTRACT

An anode support for supporting an anode electrode in a fuel cell assembly in which the anode support has a first support member formed of a porous non-wettable material and a second support member abutting and joined with the second member and having a plurality of through openings. Also disclosed is a bipolar separator having an electrolyte barrier over predetermined limited portions of its outer surface so as to prevent or retard electrolyte creeping.

22 Claims, 3 Drawing Sheets

Anode Supported by
Wire Mesh and Foam

Anode Supported by
Wire Mesh

BIPOLAR SEPARATOR PLATE FOR USE IN A FUEL CELL ASSEMBLY AND FOR PREVENTING POISONING OF REFORMING CATALYST

CROSS-REFERENCE TO RELATED APPLICATION

This application is a divisional of application Ser. No. 11/404,550, filed Apr. 14, 2006 now abandoned, the entire disclosure of which is hereby incorporated by reference.

BACKGROUND OF THE INVENTION

This invention relates to fuel cells and, in particular, to a bipolar separator plate and anode side hardware design for use in molten carbonate fuel cells.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Molten carbonate fuel cells ("MCFCs") operate by passing a reactant fuel gas through the anode, while oxidizing gas is passed through the cathode. In order to produce a useful power level, a number of individual fuel cells are stacked in series with an electrically conductive separator plate between each cell.

In internally reforming fuel cells, a steam reforming catalyst is placed within the fuel cell stack to allow direct use of hydrocarbon fuels such as methane, coal gas, etc. without the need for expensive and complex reforming equipment. Two different types of internal reforming have been used. Direct internal reforming is accomplished by placing the reforming catalyst within the active anode compartment of each fuel cell. The reforming catalyst in direct internal reforming fuel cells is typically placed in an anode current collector and is available to reform fuel gas with steam formed by the electrochemical reactions of the fuel cell and can result in very high reforming efficiency and fuel utilization.

However, direct internal reforming fuel cells experience a decay in the catalytic activity of the reforming catalyst. More particularly, over the operating life of the fuel cell, the molten carbonate electrolyte stored in the anode electrode of the cell, wets the abutting anode current collector to expose and eventually poison the reforming catalyst stored in the current collector. When the reforming catalyst is poisoned by the electrolyte, it is no longer able to perform the reforming reaction with the hydrocarbon fuels to generate sufficient hydrogen fuel for the anode reaction. The poisoning of the reforming catalyst thus reduces the reforming and electrical efficiencies of the fuel cell.

To reduce electrolyte wetting of the anode current collector, conventional systems have employed a corrugated anode current collector which can act as a barrier to shield the reforming catalyst from the electrolyte. A non-wettable barrier between the anode and the anode current collector, such as an anode support member, has also been used to impede the wetting of the anode current collector and the creepage of the electrolyte toward the reforming catalyst. For example, U.S. Pat. No. 5,558,948 discloses a support member in a form of a perforated plate member made from a metallic corrosion resistant material. Other conventional systems have employed anode support members in the form of an expanded mesh, a wire mesh, or a porous sintered powder bed (U.S. Pat. No. 6,719,946). An anode support member constructed of a high porosity reticulated foam material has also been disclosed (U.S. Pat. No. 6,379,883). Non-wettable materials used to form such anode support members typically include nickel, copper or other materials which are stable in the fuel-reducing atmosphere.

To further assist in retarding the creepage of the electrolyte, conventional systems have also employed a bipolar separator plate with a protective coating on the plate or on portions of the plate forming wet seal regions. Such protective coating is typically formed from Al or Al/Fe (JP Patent Application No. 09-025822), and is applied to the wet seal portions of the plate by thermal spraying (JP Patent Application Nos. 09-025822 and 07-295276), high velocity oxy-fuel flame spraying (U.S. Pat. No. 5,698,337), aluminum painting, ion vapor deposition or molten aluminum dip-coating (JP Patent Application No. 07-230175). For example, U.S. Pat. No. 6,372,374 discloses a bipolar separator plate design which uses a stainless steel center sheet and wet-seal pocket members fabricated from stainless steel with aluminum protective coating. In the '374 patent, the wet-seal pocket members are welded to the center sheet and aluminum is included in the weld material in a form of Al-containing filler wires. The separator plate and the anode current collector can also be coated with nickel or copper by electrolytic plating, cladding or vacuum deposition so as to further retard the electrolyte creepage to the reforming catalyst. For example, U.S. Pat. No. 5,698,337 discloses a bipolar separator plate comprising Ni-clad stainless steel.

While the above methods have been successful in slowing down the rate of electrolyte creepage, these methods suffer from a number of disadvantages. The conventional anode support members, when used to form a barrier between the corrugated current collector and the anode electrode, have been unable to provide sufficient mechanical support for the anode electrode. This results in waviness of the anode electrode causing insufficient electrical contact between the anode electrode and the abutting electrolyte matrix. The aluminum coating on the wet-seal pocket members of the separator plate is oxidized during the fuel cell operation and the surface of the wet-seal pocket members of the plate becomes wettable by the electrolyte. This allows the electrolyte to creep along the external surface of the pocket members and toward the anode current collector and the reforming catalyst through fuel inlet and outlet edges of the separator plate.

Moreover, the coating or plating processes to coat the wet-seal pocket members of the separator plate or the anode current collector with nickel or copper are expensive and significantly increase the fuel cell system manufacturing costs. The conventional electrolytic plating process used to coat the wet seal pocket members or the current collector can also result in non-uniform thickness of the coated portions of the wet seal pocket members. Such non-uniformity in thickness causes flow and pressure mal-distribution within the fuel cell system as well as insufficient electrical contact between the fuel cell components.

It is therefore an object of the present invention to provide a fuel cell assembly including an anode support, an anode current collector and a separator plate which overcomes these disadvantages.

It is also an object of the present invention to provide an improved anode support member which further reduces the electrolyte wicking rate to the reforming catalyst so as to prolong the catalyst life and provides improved mechanical support for the anode.

SUMMARY OF THE INVENTION

In accordance with certain of the embodiments of the invention described herein, the above and other objectives are realized in an anode support for supporting an anode electrode in a fuel cell assembly, comprising a first support member comprised of a porous non-wettable material and a second support member comprised of a non-wettable metallic member including a plurality of through openings. The first support member abuts and is joined with the second support member. The first and second support members each can comprise at least one of Ni, Cu, Ni alloy and Cu alloy.

More particularly, in the some forms of the invention, the first support member comprises one of a high porosity reticulated foam material and a porous sintered powder bed, while the second support layer comprises one of a wire mesh, an expanded wire mesh and a perforated plate member. In these forms of the invention, the first support member can have a porosity of less than 70% and a mean pore size of at least 20 μm, and the thickness of the first support layer can be at least 2 mils. Also in these forms of the invention, the second member can have a thickness of at least 5 mils, while the through openings in the second support member can be 20 mils or smaller in diameter and comprise at least 40% of an area of the second support member. The first support member can be joined with the second support member using a lamination process.

The first support member can form a first surface of the support and the second support member a second surface of the support. The first surface of the support is adapted to abut the anode electrode and the second surface is adapted to abut an anode current collector in a fuel cell assembly.

The above and other objectives are also realized in a bipolar separator having opposing first and second surfaces compatible with fuel gas and oxidant gas, respectively, and also having first and second opposing ends and third and fourth opposing ends. The bipolar separator also comprises first, second, third and fourth pocket members, with the first and second pocket members being situated adjacent the first and second opposing ends of the plate member and extending outward of the first surface and then facing each other and the third and fourth pocket members being situated adjacent the third and fourth opposing ends of the plate member and extending outward of the second surface and then facing each other.

The outer surface of the bipolar separator includes first and second outer surface parts formed by the outer surfaces of the third and fourth pocket members, respectively, and an electrolyte barrier is arranged on a limited portion of the first outer surface part and a limited portion of the second outer surface part.

In certain of the embodiments of the invention, the electrolyte barrier is a non-wettable material and can be in the form of a weld bead, foil or coating welded or applied to the respective limited portions of the first or second outer surface parts. Particular, usable non-wettable material might be Ni, Cu, Ni alloy and Cu alloy. The electrolyte barrier may also include a filler, such as a welding filler rod. An example of the thickness of the electrolyte barrier is a thickness in the range of between 10 and 100 μm and an example of the width of the barrier is at least 0.1 inches.

In certain forms of the invention, the third pocket member includes a back extension aligned with an end extension at the third end of the plate member, and peripheries of the back extension and the end extension form a wet-seal edge. Similarly, the fourth pocket member includes a back extension aligned with an extension at the fourth end of the plate member, and peripheries of the back extension and the second end extension form a wet-seal edge. The wet-seal edges are included in the limited portions of the first and second outer surface parts of the outer surface of the bipolar separator and the electrolyte barrier can be applied or welded to the wet-seal edges. Also, in the aforesaid forms of the invention, third and fourth welds can be used to join the third and fourth pocket members, respectively, to the end extensions of the third and fourth ends of the plate member. Additionally, the first and second pocket members include back extensions aligned with third and fourth end extensions at the first and second ends of the plate member, and welds join these back extensions and the end extensions.

A fuel cell assembly employing the anode support member and the bipolar separator plate is also disclosed.

BRIEF SUMMARY OF THE DRAWINGS

The above and other features and aspects of the present invention will become more apparent upon reading the following detailed description in conjunction with the accompanying drawings, in which.

DETAILED DESCRIPTION

Figure 1:
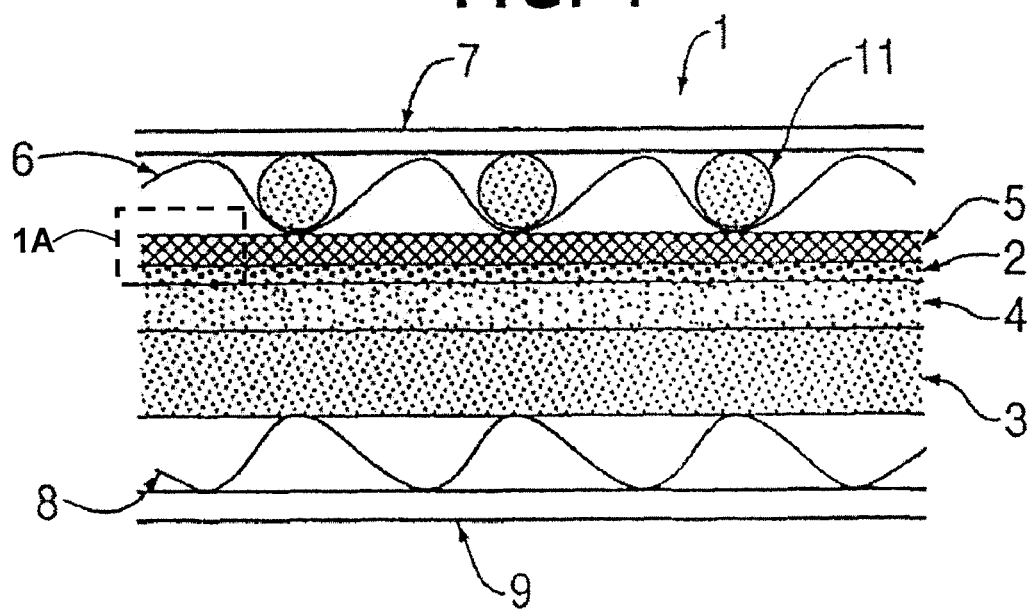
FIG. 1 shows a cross-sectional view of a fuel cell assembly of a molten carbonate fuel cell with direct internal gas reforming.

FIG. 1 shows a cross-sectional view of a fuel cell assembly 1 of a molten carbonate fuel cell with direct internal gas reforming. The fuel cell assembly 1 includes an anode electrode 2 and a cathode electrode 3 separated by, and in direct contact with, an electrolyte matrix 4. The electrolyte matrix 4 is filled with carbonate electrolyte, and additional electrolyte is provided in the pores of the anode and cathode electrodes.

The assembly 1 also includes an anode support 5 abutting the anode electrode 2 and a corrugated anode current collector 6 abutting the support member 5 on the anode side of the assembly and a cathode current collector 8 abutting the cathode electrode 3 on the cathode side of the assembly 1. As described in further detail below, the anode support 5 provides mechanical support for the anode electrode 2 and also acts as a barrier to electrolyte creeping from the anode electrode to the anode current collector 6.

As shown, the anode side of the fuel cell assembly 1 is separated from an adjacent fuel cell assembly by a first bipolar plate 7, while the cathode side of the assembly 1 is separated from another adjacent fuel cell assembly by a second bipolar plate 9. As also shown, the anode current collector 6 houses a direct reforming catalyst 11 in the spaces or passages defined by the corrugations of the current collector 6 between the current collector 6 and the bipolar plate 7. In this way, the anode current collector acts as an additional barrier to electrolyte creeping to protect the reforming catalyst 11 from poisoning by the electrolyte.

Figure 2:
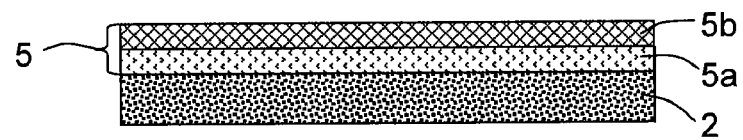
FIG. 2 shows a detailed cross-sectional view of a portion of the assembly of FIG. 1 encircled as "1A" in FIG. 1.

FIG. 2 shows a detailed cross-sectional view of a portion of the assembly of FIG. 1 encircled as "1A" in FIG. 1. In particular, FIG. 2 shows a more detailed view of the anode electrode 2 and the anode support 5 shown in FIG. 1. The anode electrode 2 comprises a porous material with a high surface area, such as a nickel alloy. For example, the anode electrode 2 may be formed from Ni—Al or Ni—Cr powder, in which Al and Cr are used as stabilizing agents to enhance the mechanical strength of the electrode 2 and to prevent excessive anode sintering at fuel cell operating temperatures, i.e. 500-700° Celsius. The anode electrode 2 may further include organic binders such as an acrylic polymer. During the operation of the fuel cell assembly 1, the anode electrode 2 is filled with carbonate electrolyte, which takes up between 5 and 50% of the void volume of the electrode. In order to reduce manufacturing costs, the anode electrode is preferably a thin anode electrode having a thickness between 2 and 10 mils.

As shown, the anode electrode 2 abuts the anode support 5, which provides mechanical support for the anode electrode 2 and prevents the electrolyte in the anode 2 from creeping to the anode current collector (not shown for clarity and simplicity in FIG. 2) and the reforming catalyst stored in the current collector. The anode support 5 comprises a plurality of supporting members including a first support member 5a and a second support member 5b. Both the first and the second supporting members 5a, 5b comprise non-wettable metallic materials such as nickel, copper or alloys of nickel or copper. Other non-wettable materials which are stable in the fuel-reducing atmosphere may also be used to form the support members of the support 5. For example, nickel or chromium alloys such as nickel-chromium or nickel-aluminum, and mixtures thereof, are suitable materials for forming the support members 5a, 5b of the support 5. The first and second support members 5a, 5b are joined with one another by laminating in a press or a pinch roller or using any other suitable technique.

As shown in FIG. 2, the first support member 5a is disposed in an abutting relationship with the anode electrode 2 and is formed as a porous member. For example, the high porosity reticulated foam disclosed in U.S. Pat. No. 6,379,833 or the porous sintered powder bed disclosed in U.S. Pat. No. 6,719, 946 are suitable for use as the first support member 5a. The porosity of the first support member 5a is preferably less than 70% so that the member 5a has sufficient creep strength, and the mean pore size of the member 5a is preferably at least 20 μm. When the first support member 5a is joined with the second support member 5b, the final compressed thickness of the first support member 5a can be at least 2 mils.

The second support member 5b follows and abuts the first support member 5a and is formed as a member having a plurality of through openings. In particular, the second support member 5b can be formed as a perforated plate, as a wire mesh or an expanded mesh member. The second support member 5b can have a thickness of at least 5 mils and through openings which comprise at least 40% of its total area, with the opening size being 20 mils or less in diameter.

Figure 3A:
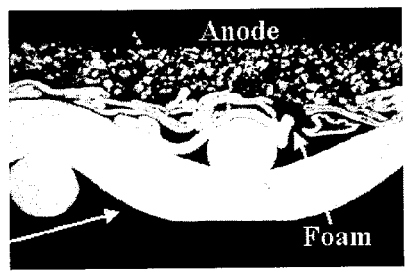
FIG. 3A shows a photograph of an anode electrode supported by the anode support of FIG. 2.
Figure 3B:
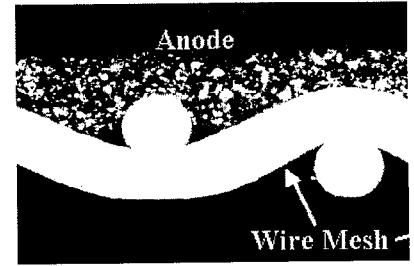
FIG. 3B shows a photograph of an anode electrode supported by a conventional wire mesh anode support.

A photograph of an anode electrode 2 supported by the anode support 5 of FIG. 2 is shown in FIG. 3A, while a photograph of an anode supported by a conventional wire mesh anode support is shown in FIG. 3B. As can be seen in FIG. 3B, the conventional wire mesh support has an uneven or wavy surface, and the anode electrode directly abutting the support, conforms to this wavy surface of the support member. In FIG. 3A, the anode support 5 of FIG. 2, as discussed above, has the metallic foam support member 5a disposed between the wire mesh support member 5b and the anode electrode 2. The foam support member fills the spaces between the surfaces of the anode electrode 2 and the wire mesh support member 5b, thus providing additional mechanical support to the anode electrode 2. This added mechanical support results in a smoother anode surface abutting, and contacting with, the electrolyte matrix 4, thus improving the electrical contact between the anode electrode 2 and the matrix 4.

Surface roughness of the surface abutting the electrolyte matrix 4 of the anode electrode supported by the anode support 5 shown in FIG. 3A was measured using a profilometer and compared with the surface roughness of the surface abutting the matrix of the anode electrode supported by the conventional wire mesh support as shown in FIG. 3B. In particular, the surface profilimetry measurements were taken using 6.5 ml anodes supported by the conventional wire mesh support member, 6.5 ml anodes supported by 25 mil and 20 mil foam and wire mesh support members, and 4.5 ml anodes supported by 18 mil foam and wire mesh support members. These profilometer measurements of the anode surface roughness in microinches are summarized in Table 1, as follows:

TABLE 1

|   | 6.5 ml Anode with Conventional Mesh Support Member | 6.5 ml Anode with 25mil Foam-Mesh Support | 6.5 ml Anode with 20 mil Foam-Mesh Support | 4.5 ml Anode with 18 mil Foam-Mesh Support |
|---|---|---|---|---|
| 1 | 157 | 94 | 91 | 87 |
| 2 | 145 | 77 | 108 | 96 |
| 3 | 130 | 87 | 84 | 97 |
| 4 | 145 | 80 | 94 | 109 |
| 5 | 156 | 81 | 92 | 105 |
| Avg | 147 | 84 | 94 | 99 |

As shown in Table 1, the surface roughness of the anode electrode was significantly reduced by using the additional foam member 5a in support 5 for supporting the electrode. Such a reduction of surface roughness of the anode electrode surface indicates that the anode is better supported mechanically by the support member and that the electrical contact between the anode electrode and the electrolyte matrix is improved.

As discussed above, in addition to providing support for the anode electrode 2, the anode support 5 slows down the electrolyte creepage from the electrolyte matrix 4 and the anode electrode 2 to the reforming catalyst 11 stored in the anode current collector 6. In particular, the anode support 5 forms a physical barrier between the anode electrode 2 and the anode current collector 6. The non-wettability of the materials comprising the anode support 5 further prevents or reduces electrolyte creepage to the reforming catalyst 11.

Figure 4:
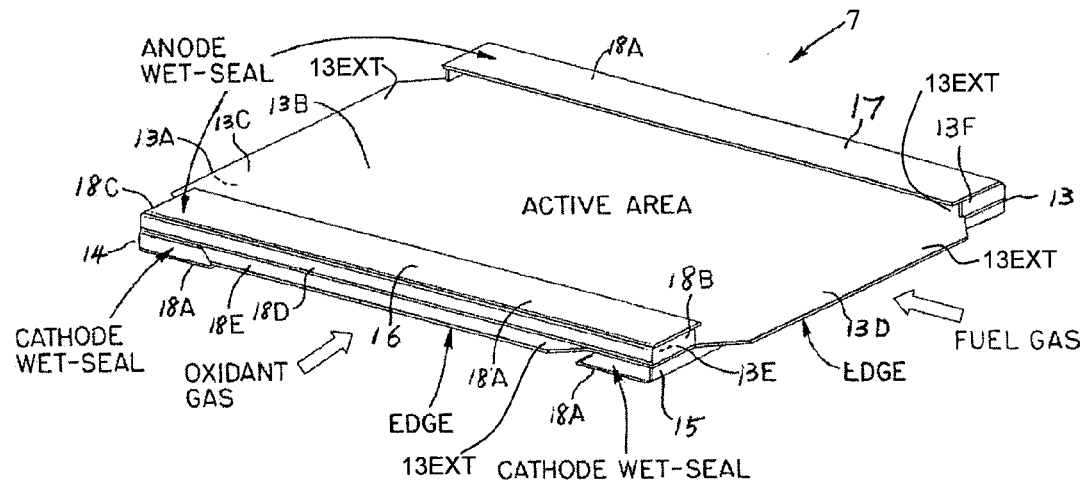
FIG. 4 shows a perspective view of an illustrative construction of the bipolar separator plate shown in FIG. 1.

Electrolyte creeping from the matrix to the reforming catalyst can also be reduced by providing a non-wettable barrier on pre-selected limited portions of the outer surface of each of the bipolar separator plates 7, 9. FIG. 4 shows a perspective view of an illustrative construction of the bipolar separator plate 7 shown in FIG. 1. As can be appreciated, the construction of the bipolar separator 9 is substantially the same as that of the bipolar separator 7. The general construction of the bipolar separator plate 7 is similar to the bipolar separator plate disclosed in the commonly assigned U.S. Pat. No. 6,372, 374, the entire disclosure of which is incorporated herein by reference.

As shown in FIG. 4, the bipolar plate 7 includes a central plate member 13 having first and second surfaces 13A and 13B which are compatible with oxidant and fuel gases, respectively. In this illustrative example, the plate member 13 includes four opposing ends, with opposing ends 13D and 13C corresponding to fuel inlet and fuel outlet ends of the fuel cell assembly, respectively, and opposing ends 13E and 13F forming oxidant inlet and oxidant outlet ends of the assembly, respectively. Each end 13C-13F of the of the plate member 13 has an end extension 13EXT and a pocket member is formed or arranged adjacent each end extension.

As shown in FIG. 4, pocket members 14, 15 are situated adjacent opposing end extensions of plate ends 13C, 13D and extend outward of the first surface 13A of the plate member 13 and then toward each other. Similarly, the pocket members 16, 17 are situated adjacent the other opposing end extensions of the ends 13E, 13F and extend outward of the second surface 13B of the plate member 13 and then toward each other.

As in the '374 patent, the plate member 13 is preferably formed separately from the pocket members 14-17, and the pocket members 14-17 are joined with the plate member 13 by welding or any other suitable conventional technique. The plate member 13 can be formed from an austenitic high-temperature stainless steel which preferably includes 18-26 wt % Cr and 11-33 wt % Ni. For example, stainless steel 310, 347 or 309 are suitable for forming the plate member 13. The pocket members 14-17 can, in turn be formed from stainless steel, which can be coated or clad with aluminum to protect the pocket members from corrosion by the reducing and oxidizing gases. As will be discussed below, a non-wettable material or coating is provided only on predetermined or pre-selected limited portions of the outer surface of the bipolar plate 7.

As shown in FIG. 4, each pocket member 14, 15, 16, 17 includes a top wall 18A, side walls 18B, 18C, a back wall 18D and a back extension 18E. The top wall 18A of the pocket members 14, 15 faces the first surface 13A, which is oxidant gas compatible, while the top walls 18A of the pocket members 16, 17 face the second surface 13B, which is fuel gas compatible. In this way, the pocket members 14, 15 are on the oxidant side of the bipolar plate 7, while the pocket members 16, 17 are on the fuel side of the bipolar plate 7. The pocket members 14-17 act as rails and the surfaces of these rails form wet seal areas with the abutting electrolyte matrix. These wet seal areas keep the oxidant gas and the fuel gas from leaking from the cathode and the anode, respectively, so as to prevent gas crossover and escape of these gases from the fuel cell assembly.

Figure 5:
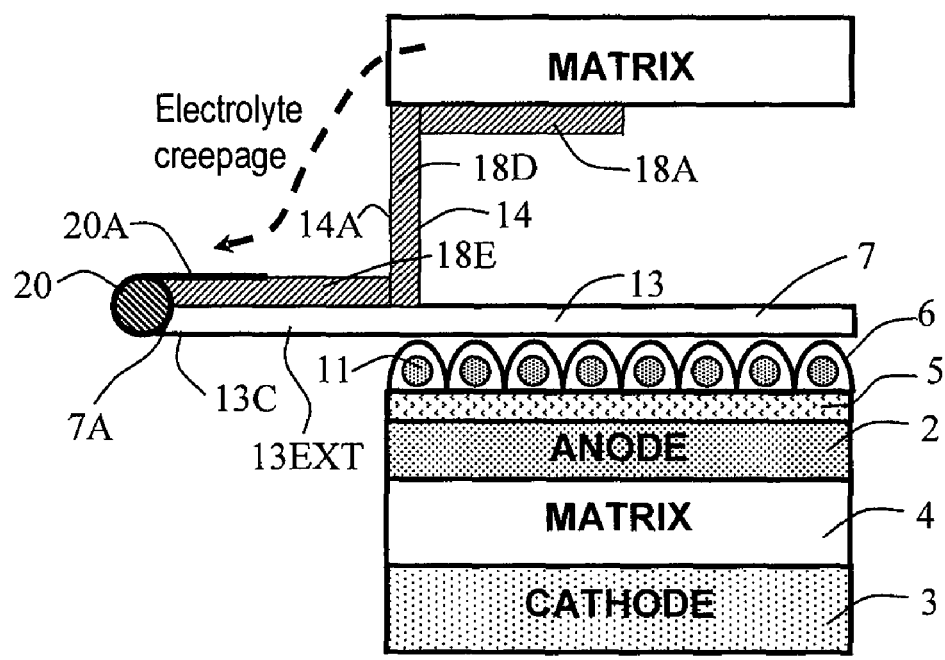
FIG. 5 shows a detailed cross-sectional view of a fuel outlet end portion of the fuel cell assembly of FIG. 1 including the bipolar plate of FIG. 4.

In the example of FIG. 4, the back extensions 18E of the pocket members 14-18 are welded to the end extensions 13EXT of the corresponding ends 13C-13F of the plate 13. This is shown clearly in FIG. 5 for the back extension of the pocket member 14. More particularly, FIG. 5 shows a cross-sectional view of a fuel outlet end portion of the fuel cell assembly of FIG. 1 using the bipolar plate 7 of FIG. 4. Specifically, FIG. 5 shows a cross-sectional view of the fuel outlet end 13C of the plate member 13 and the oxidant side pocket member 14 formed adjacent the fuel outlet end 13C. As can be appreciated, the fuel inlet end portion of the fuel cell assembly which includes the pocket member 15, has a substantially identical construction as the fuel outlet end portion shown in FIG. 5.

As discussed above with respect to FIG. 4 and as can be seen in FIG. 5, the pocket member 14 includes the top wall 18A, the back wall 18D and the back extension 18E. The side walls 18B, 18C of the pocket member 14 are not visible in FIG. 5. The back extension 18E co-extends with the end extension 13EXT of the fuel outlet end 13C of the plate member 13 and is welded thereto. The edge of the back extension 18E and the edge of the end extension of the fuel outlet end 13C form a wet seal edge 7A of the bipolar plate.

As can be seen, the top wall 18A of the pocket member 14 is in direct contact with the electrolyte-filled matrix 4. During fuel cell operation, as indicated by an arrow in FIG. 5, the electrolyte creeps from the matrix 4 along the outer surface 14A of the pocket member 14 which outer surface forms a first part of the outer surface of the separator 7. The electrolyte continuously creeps along the outer surface 14A of the pocket member 14 to the end of the edge of the surface. From there, the electrolyte creeps onto the edge of the outer surface of the back extension 13EXT of the end 13C of the plate 13. From this edge it continues to creep on this outer surface which is forms the anode side surface 13A of the plate member 13.

The surface 13A is in direct contact with the anode current collector 6 housing the reforming catalyst 11. Accordingly, continued creep of the electrolyte results in the electrolyte reaching the catalyst, thereby poisoning the catalyst. Moreover, as discussed above, conventional aluminum coatings on the outer surface 14A of the pocket member 14 oxidize during fuel cell operation and become wettable, thus allowing this electrolyte creep and catalyst poisoning to take place.

As also mentioned above, the bipolar plate 7 includes a non-wettable electrolyte barrier provided at pre-selected limited portions of first and second parts of the outer surface of the separator to retard electrolyte creepage and, therefore, prevent poisoning of the reforming catalyst. In the illustrative case shown in FIG. 5, the electrolyte barrier is identified at 20 and is provided to a portion of the outer surface 14A of the pocket member 14 (first part of the outer surface of the separator) and, in particular, to the outer surface of the edge of the back extension 18E of the pocket member. It is also applied to the outer surface of the edge of the end extension 13EXT of the end 13C of the plate 13. The barrier 20 thus covers the wet seal edge 7A of the bipolar plate 7.

The electrolyte barrier 20 can comprise a non-wettable material, such as Ni or Cu, or an alloy of Ni or Cu, which is stable in the fuel cell atmosphere. In one example, the non-wettable barrier 20 is formed as a weld bead comprising Ni or Cu material, applied to the aforementioned edges forming the wet seal edge 7A. Alternatively, the electrolyte barrier 20 may formed as a foil welded to such edges or as a non-wettable coating applied to such edges by cladding, plating, thermal spraying, vacuum deposition or any other known methods. When the non-wettable barrier is formed from a foil or coating, additional non-wettable filler material, such as an Ni or Cu welding filler rod, may also be applied to surface of the edges to increase the Ni or Cu content of the barrier. A typical thickness of the electrolyte barrier 20 is 10 to 100 μm and typical width of the barrier is greater than 0.1 inches.

As also shown in FIG. 5, the electrolyte barrier 20 may further comprise an additional non-wettable coating 20A applied to an additional portion of the outer surface 14A of the pocket member 14 along the back extension 18E. This additional coating further slows down the creeping or wicking of the electrolyte toward the wet seal edge 7A. In the case illustrated, the coating 20A extends from the wet seal edge 7A along a predetermined portion of the width of the back extension 18E. A typical width of the non-wettable coating 20A is a width greater than 0.03 inches and typical coating materials are Ni, Cu, Ni alloy and Cu alloy. The coating 20A can be applied to the back extension 18E using any suitable conventional method such as cladding, plating, thermal spraying or vacuum deposition.

Because the barrier 20 including the non-wettable coating 20A is applied only to limited a portion of the outer surface of the pocket member 14, rather than to the entire outer surface of the pocket member 14, the manufacturing cost of the bipolar separator plate 7 is reduced. This is accomplished without affecting the ability of the separator to prevent electrolyte creeping toward the reforming catalyst.

As mentioned above, the fuel inlet end of the bipolar plate, which includes the other pocket member 15 adjacent the fuel inlet end 13D of the plate member 13, has a substantially an identical barrier applied to it at portion of its outer surface (the second part of the surface of the separator). The pocket members 16-17 on the fuel side of the bipolar plate 7, which also have similar constructions as the pocket members 14 and 15, while they make include similar barriers as the pocket members 14-15, do not require such barriers. Not using barriers with these pocket members and using the barrier members only at the fuel inlet and outlet ends of the bipolar plate 7, as above-described, can therefore result in additional cost savings in manufacturing the bipolar plate 7.

In all cases it is understood that the above-described arrangements are merely illustrative of the many possible specific embodiments that represent applications of the present invention. Numerous varied other arrangements can be readily devised in accordance with the principles of the present invention without departing from the spirit and scope of the invention.

I claim:

1. A bipolar separator for use with a fuel cell comprising:
    a plate member having opposing first and second surfaces compatible with fuel gas and oxidant gas, respectively, said plate member having first and second opposing ends and third and fourth opposing ends;
    first, second, third and fourth pocket members, said first and second pocket members being situated adjacent said first and second opposing ends of said plate member and extending outward of said first surface and then facing each other and said third and fourth pocket members being situated adjacent said third and fourth opposing ends of said plate member and extending outward of said second surface and then facing each other, said third and fourth pocket members each having an inner surface facing the plate member and an outer surface opposing said inner surface and facing away from said plate member;
    said bipolar separator having first and second outer surface parts formed by outer surfaces of said third and fourth pocket members, respectively;
    and an electrolyte barrier comprising a non-wettable material situated on a limited portion of an outer surface of said third pocket member and a limited portion of an outer surface of said fourth pocket member, wherein the limited portion of said outer surface is smaller than the entire outer surface, said limited portion of said outer surface of said third pocket member includes a surface portion at the end of said outer surface of said third pocket member closest to said plate member and said limited portion of said outer surface of said fourth pocket member includes a surface portion at the end of said outer surface of said fourth pocket member closest to said plate member.

2. A bipolar separator in accordance with claim 1, wherein said electrolyte barrier comprises one of a weld bead, a foil welded to and a coating applied to said limited portion of the outer surface of said third pocket member and to said limited portion of the outer surface of said fourth pocket member.

3. A bipolar separator in accordance with claim 2, wherein said electrolyte barrier comprises at least one of Ni, Cu, Ni alloy and Cu alloy.

4. A bipolar separator in accordance with claim 3, wherein said electrolyte barrier further comprises a filler.

5. A bipolar separator in accordance with claim 4, wherein said filler comprises a welding filler rod.

6. A bipolar separator in accordance with claim 2, wherein said electrolyte barrier has a thickness of 10 to 100 μm and a width of at least 0.254 cm.

7. A bipolar separator in accordance with claim 1, wherein:
    said electrolyte barrier comprises one of a weld bead and a foil welded to said limited portion of the outer surface of said third pocket member and to said limited portion of the outer surface of said fourth pocket member; and
    said electrolyte barrier further comprises a non-wettable coating: applied to said limited portion of the outer surface of said third pocket member and extending from said one of said weld bead and said foil welded to said limited portion of said outer surface of said third pocket; and applied to said limited portion of the outer surface of said fourth pocket member and extending from said one of said weld bead and said foil welded to said limited portion of said outer surface of said fourth pocket member.

8. A bipolar separator in accordance with claim 1, wherein:
    said third pocket member includes a back extension aligned with an end extension at said third end of said plate member, edge surfaces of said back extension of said third pocket member and said end extension at said third end of said plate member forming a wet-seal edge, and
    said fourth pocket member includes a back extension aligned with an end extension at said fourth end of said plate member, edge surfaces of said back extension of said fourth pocket member and said end extension at said fourth end of said plate member forming a wet-seal edge; and
    wherein the edge surface of the back extension of said third pocket member forms a part of the limited portion of the outer surface of the third pocket member and the edge surface of the back extension of the fourth pocket member forms a part of the limited portion of the outer surface of the fourth pocket member.

9. A bipolar separator in accordance with claim 8, wherein:
    said electrolyte barrier comprises one of a weld bead, a foil welded to and a coating applied to said limited portion of the outer surface of said third pocket member and to said limited portion of the outer surface of said fourth pocket member.

10. A bipolar separator in accordance with claim 8:
    said electrolyte barrier comprises one of a weld bead and a foil welded to said limited portion of the outer surface of said third pocket member and to said limited portion of the outer surface of said fourth pocket member; and
    said electrolyte further comprises a non-wettable coating: applied to said limited portion of the outer surface of said third pocket member and extending from said one of said weld bead and said foil welded to said limited portion of said outer surface of said third pocket; and applied to said limited portion of the outer surface of said fourth pocket member and extending from said one of said weld bead and said foil welded to said limited portion of said outer surface of said fourth pocket member.

11. A bipolar separator in accordance with claim 8, wherein;
    said plate member is formed separately from said pocket members,
    said first pocket member includes a back extension aligned with an end extension at said first end of said plate member;
    and said second pocket member includes a back extension aligned with an end extension at said second end of said plate member; and
    said back extensions of said first, second, third and fourth pocket member are welded to the end extensions at the first, second, third and fourth ends of said plate member.

12. A fuel cell assembly comprising:
a fuel cell including an anode, a cathode and an electrolyte matrix disposed between said anode and said cathode;
an anode current collector abutting said anode and forming a plurality of passages for passing fuel gas and storing a reforming catalyst therein; and
a bipolar separator abutting said anode current collector for separating said fuel cell assembly from an adjacent fuel cell assembly, said bipolar separator comprising a plate member having opposing first and second surfaces, said first surface being compatible with fuel gas and abutting said anode current collector and said second surface being compatible with oxidant gas and abutting said adjacent fuel cell assembly, said plate member having first and second opposing ends and third and fourth opposing ends;
first, second, third and fourth pocket members, said first and second pocket members being situated adjacent said first and second opposing ends of said plate member and extending outward of said first surface and then facing each other, and said third and fourth pocket members being situated adjacent said third and fourth opposing ends of said plate member and extending outward of said second surface and then facing each other, said third and fourth pocket members each having an inner surface facing the plate member and an outer surface opposing said inner surface and facing away from said plate member;
said bipolar separator having first and second outer surface parts formed by outer surfaces of said third and fourth pocket members, respectively;
and an electrolyte barrier comprising a non-wettable material situated on a limited portion of an outer surface of said third pocket member and a limited portion of an outer surface of said fourth pocket member, wherein the limited portion of the outer surface is smaller than the entire outer surface, said limited portion of said outer surface of said third pocket member includes a surface portion at the end of said outer surface of said third pocket member closest to said plate member and said limited portion of said outer surface of said fourth pocket member includes a surface portion at the end of said outer surface of said fourth pocket member closest to said plate member.

13. A fuel cell assembly in accordance with claim 12, wherein said electrolyte barrier comprises a non-wettable material comprising at least one of Ni, Cu, Ni alloy and Cu alloy.

14. A fuel cell assembly in accordance with claim 12, wherein said electrolyte barrier comprises one of a weld bead, a foil welded to and a coating applied to said limited portion of the outer surface of said third pocket member and to limited portion of the outer surface of said fourth pocket member.

15. A fuel cell assembly in accordance with claim 14, wherein said electrolyte barrier further comprises a filler.

16. A fuel cell assembly in accordance with claim 15, wherein said filler comprises a welding filler rod.

17. A fuel cell assembly in accordance with claim 14, wherein said electrolyte barrier has a thickness of 10 to 100 μM and a width of at least 0.254 cm.

18. A fuel cell assembly in accordance with claim 12, wherein:
said electrolyte barrier comprises one of a weld bead and a foil welded to said limited portion of the outer surface of said third pocket member and to said limited portion of the outer surface of said fourth pocket member; and
said electrolyte barrier further comprises a non-wettable coating: applied to said limited portion of the outer surface of said third pocket member and extending from said one of said weld bead and said foil welded to said limited portion of said outer surface of said third pocket; and applied to said limited portion of the outer surface of said fourth pocket member and extending from said one of said weld bead and said foil welded to said limited portion of said outer surface of said fourth pocket member.

19. A fuel cell assembly in accordance with claim 12, wherein:
said third pocket member includes a back extension aligned with an end extension at said third end of said plate member, edge surfaces of said back extension of said third pocket member and said end extension at said third end of said plate member forming a wet-seal edge, and
said fourth pocket member includes a back extension aligned with an end extension at said fourth end of said plate member, edge surfaces of said back extension of said fourth pocket member and said end extension at said fourth end of said plate member forming a wet-seal edge; and
wherein the edge surface of the back extension of said third pocket member forms a part of the limited portion of the outer surface of the third pocket member and the edge surface of the back extension of the fourth pocket member forms a part of the limited portion of the outer surface of the fourth pocket member.

20. A fuel cell assembly in accordance with claim 19, wherein:
said electrolyte barrier comprises one of a weld bead, a foil welded to and a coating applied to said limited portion of the outer surface of said third pocket member and to said limited portion of the outer surface of said fourth pocket member.

21. A fuel cell assembly in accordance with claim 19:
said electrolyte barrier comprises one of a weld bead and a foil welded to said limited portion of the outer surface of said third pocket member and to said limited portion of the outer surface of said fourth pocket member; and
said electrolyte further comprises a non-wettable coating: applied to said limited portion of the outer surface of said third pocket member and extending from said one of said weld bead and said foil welded to said limited portion of said outer surface of said third pocket; and applied to said limited portion of the outer surface of said fourth pocket member and extending from said one of said weld bead and said foil welded to said limited portion of said outer surface of said fourth pocket member.

22. A fuel cell assembly in accordance with claim 19, wherein;
said plate member is formed separately from said pocket members,
said first pocket member includes a back extension aligned with an end extension at said first end of said plate member;
and said second pocket member includes a back extension aligned with an end extension at said second end of said plate member; and
said back extensions of said first, second, third and fourth pocket member are welded to the end extensions at the first, second, third and fourth ends of said plate member.

* * * * *